(12) United States Patent
Panyavoravaj et al.

(10) Patent No.: US 7,876,523 B1
(45) Date of Patent: Jan. 25, 2011

(54) DISK DRIVE INITIALIZING POSITION FEEDFORWARD COMPENSATION WITH VELOCITY FEEDFORWARD COMPENSATION

(75) Inventors: Boworn Panyavoravaj, Bangkok (TH); Chaisit Siricharoenchai, Bangkok (TH)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/537,974

(22) Filed: Aug. 7, 2009

(51) Int. Cl.
G11B 5/596 (2006.01)
G11B 21/02 (2006.01)
G11B 5/09 (2006.01)

(52) U.S. Cl. .................. 360/77.07; 360/75; 360/51

(58) Field of Classification Search .............. None
See application file for complete search history.

(56) References Cited

U.S. PATENT DOCUMENTS

| | | | |
|---|---|---|---|
| 4,669,004 A | 5/1987 | Moon et al. | |
| 5,668,679 A * | 9/1997 | Swearingen et al. | 360/75 |
| 5,946,158 A | 8/1999 | Nazarian et al. | |
| 5,982,173 A | 11/1999 | Hagen | |
| 6,067,204 A | 5/2000 | Tremaine | |
| 6,091,564 A | 7/2000 | Codilian et al. | |
| 6,091,567 A | 7/2000 | Cooper et al. | |
| 6,369,974 B1 | 4/2002 | Asgari et al. | |
| 6,768,609 B2 | 7/2004 | Heydt et al. | |
| 6,937,420 B1 | 8/2005 | McNab et al. | |
| 6,989,956 B2 | 1/2006 | Takaishi et al. | |
| 7,019,937 B1 | 3/2006 | Liikanen et al. | |
| 7,023,637 B1 | 4/2006 | Kupferman | |
| 7,027,257 B1 | 4/2006 | Kupferman | |
| 7,061,708 B2 | 6/2006 | Ehrlich et al. | |
| 7,123,433 B1 | 10/2006 | Melrose et al. | |
| 7,130,146 B2 | 10/2006 | Ehrlich | |
| 7,149,048 B1 | 12/2006 | Ray et al. | |
| 7,180,696 B2 | 2/2007 | Ehrlich | |
| 7,230,786 B1 | 6/2007 | Ray et al. | |
| 7,230,789 B1 | 6/2007 | Brunnett et al. | |
| 7,245,451 B2 | 7/2007 | Ehrlich | |
| 7,253,984 B1 | 8/2007 | Patapoutian et al. | |
| 7,256,956 B2 | 8/2007 | Ehrlich | |
| 7,265,933 B1 | 9/2007 | Phan et al. | |
| 7,312,943 B2 * | 12/2007 | Lau et al. | 360/75 |
| 7,382,564 B1 | 6/2008 | Everett et al. | |
| 7,423,835 B2 | 9/2008 | Sado et al. | |
| 7,450,336 B1 | 11/2008 | Wang et al. | |
| 7,542,230 B1 | 6/2009 | Melrose et al. | |
| 7,616,399 B1 | 11/2009 | Chen et al. | |

(Continued)

FOREIGN PATENT DOCUMENTS

JP 2001256741 A 9/2001

*Primary Examiner*—Andrew L Sniezek (57) ABSTRACT

A disk drive is disclosed comprising a head actuated over a disk comprising a plurality of spiral tracks, wherein each spiral track comprises a high frequency signal interrupted by a sync mark at a sync mark interval. The head is positioned over the disk and used to read the spiral tracks to detect a plurality of spiral-to-spiral times each representing a time between consecutive spiral crossings. A velocity of the head is estimated in response to the spiral-to-spiral times, and velocity feedforward compensation values are generated from the estimated head velocity. A control signal is generated to position the head over the disk in response to the velocity feedforward compensation values. When the detected spiral-to-spiral times are substantially constant, position feedforward compensation values are initialized in response to the velocity feedforward compensation values.

12 Claims, 9 Drawing Sheets

U.S. PATENT DOCUMENTS 7,656,604 B1 * 2/2010 Liang et al. .................. 360/75
2009/0067084 A1 3/2009 Lau et al.
2009/0097157 A1 4/2009 Spaur et al.

* cited by examiner

DISK DRIVE INITIALIZING POSITION FEEDFORWARD COMPENSATION WITH VELOCITY FEEDFORWARD COMPENSATION

BACKGROUND

Figure 1:
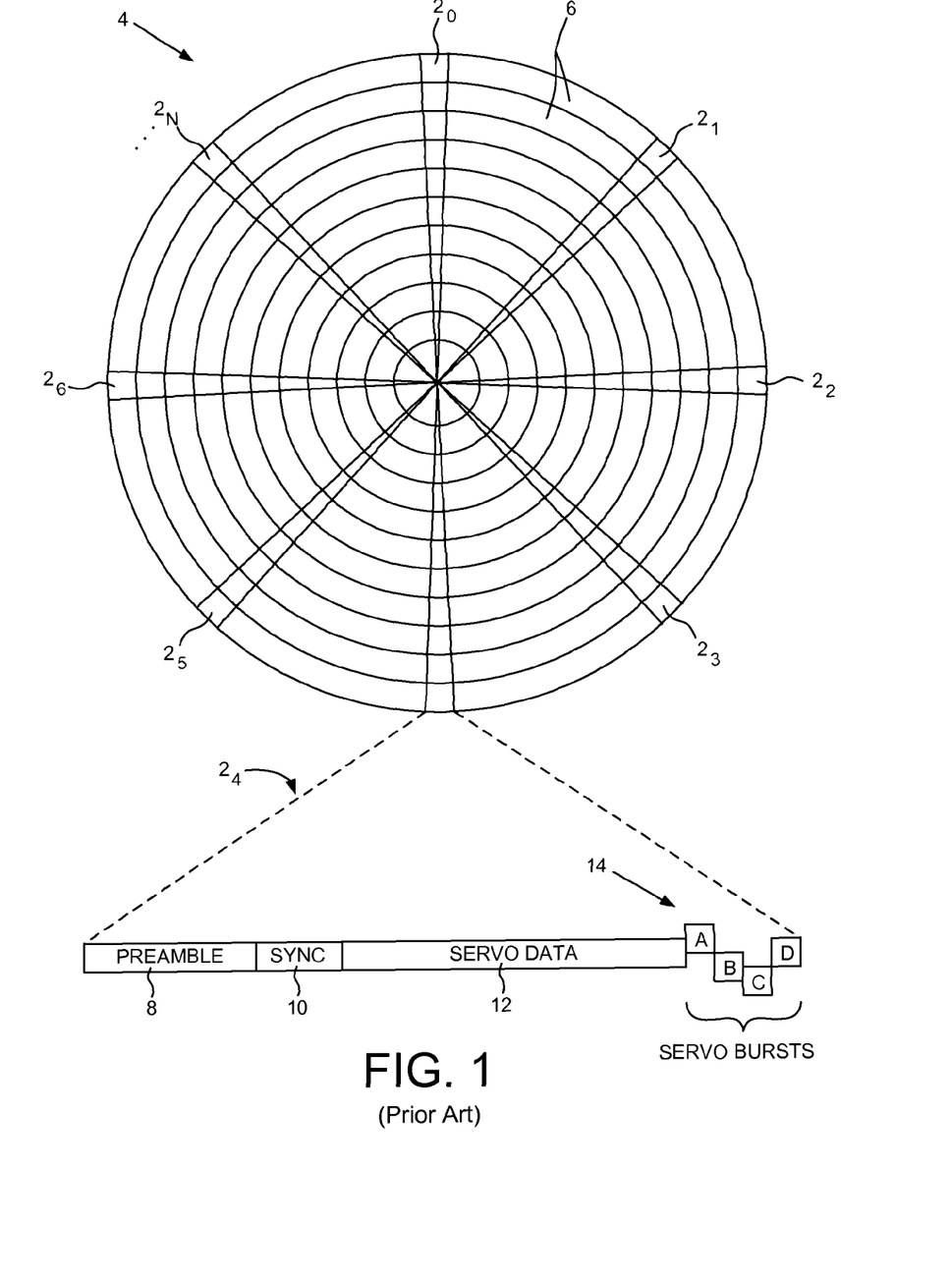
FIG. 1 shows a prior art disk format comprising a plurality of data tracks defined by embedded servo sectors.

When manufacturing a disk drive, servo sectors $2_0\text{-}2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0\text{-}2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the product servo sectors $2_0\text{-}2_N$ to the disk surface during manufacturing. External servo writers employ extremely accurate head positioning mechanics, such as a laser interferometer, to ensure the product servo sectors $2_0\text{-}2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. The read signal is rectified and low pass filtered to generate a triangular envelope signal representing a spiral track crossing, wherein the location of the spiral track is detected by detecting a peak in the triangular envelope signal relative to a clock synchronized to the rotation of the disk.

DETAILED DESCRIPTION OF EMBODIMENTS OF THE INVENTION

Figures 2A, 2B:
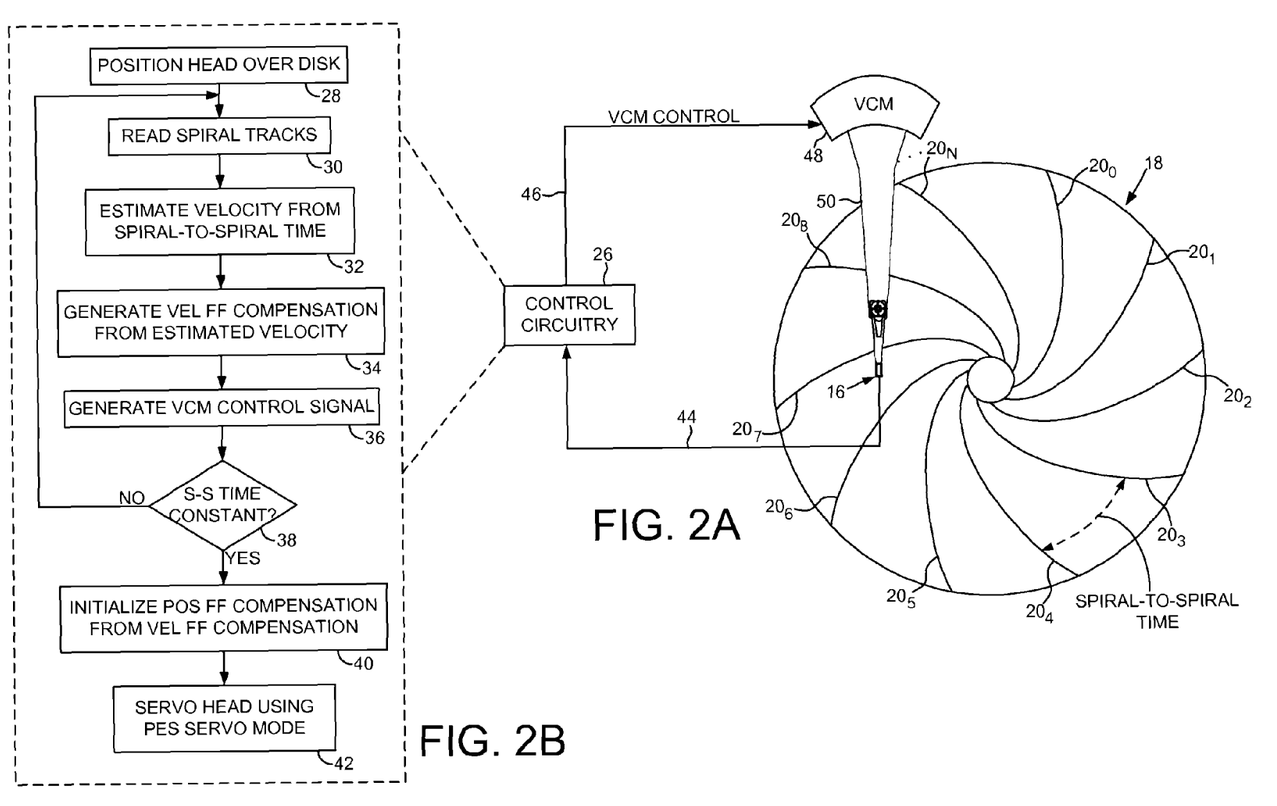
FIG. 2A shows a disk drive according to an embodiment of the present invention wherein a plurality of pre-written spiral tracks are processed during a velocity error servo mode in order to generate initial feedforward compensation values for use during a position error servo mode.
FIG. 2B is a flow diagram executed by the control circuitry to generate the velocity feedforward compensation values which are used as initial values for the position feedforward compensation values.
Figure 4A:
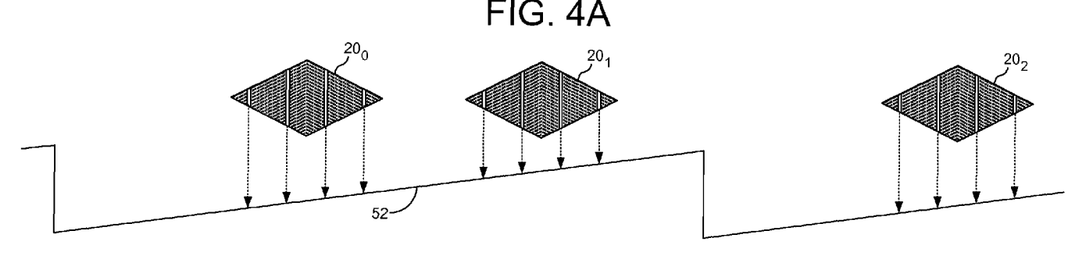
FIG. 4A shows an embodiment of the present invention wherein a servo write clock is synchronized by clocking a modulo-N counter relative to when the sync marks in the spiral tracks are detected.
Figure 4B:
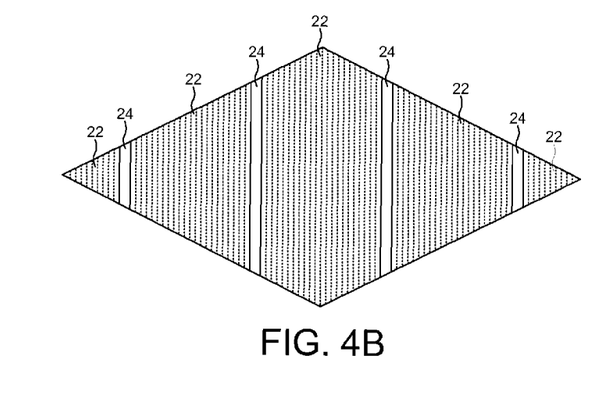
FIG. 4B shows an eye pattern generated by reading the spiral track, including the sync marks in the spiral track.

FIG. 2A shows a disk drive comprising a head 16 actuated over a disk 18 comprising a plurality of spiral tracks $20_0\text{-}20_N$, wherein each spiral track comprises a high frequency signal 22 interrupted by a sync mark 24 at a sync mark interval (FIG. 4B). The disk drive further comprises control circuitry 26 for executing the flow diagram of FIG. 2B. The head 16 is positioned over the disk (step 28) and used to read the spiral tracks to detect a plurality of spiral-to-spiral times each representing a time between consecutive spiral crossings (step 30). A velocity of the head is estimated in response to the spiral-to-spiral times (step 32), and velocity feedforward compensation values are generated from the estimated head velocity (step 34). A control signal is generated to position the head over the disk in response to the velocity feedforward compensation values (step 36). When the detected spiral-to-spiral times are substantially constant (step 38), position feedforward compensation values are initialized in response to the velocity feedforward compensation values (step 40). A position of the head is estimated in response to the spiral tracks, and the head is served in response to the estimated head position and the position feedforward compensation values (step 42).

In the embodiment of FIG. 2A, the control circuitry 26 processes a read signal 44 emanating from the head 16 to estimate the velocity of the head during velocity error servo mode, and to estimate the position of the head during position error servo mode. The control circuitry 26 generates a control signal 46 applied to a voice coil motor (VCM) 48 which rotates an actuator arm 50 about a pivot in order to position the head radially over the disk in a direction that reduces the velocity/position error.

Figure 3:
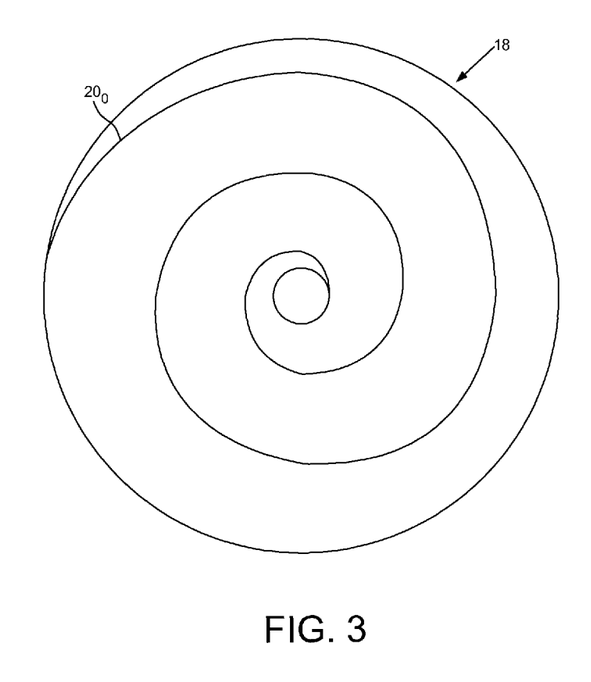
FIG. 3 illustrates an embodiment of the present invention wherein each spiral track is written over multiple revolutions of the disk.

In the embodiment of FIG. 2A, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18.

In one embodiment, the control circuitry 26 within the disk drive is used to process the spiral tracks $20_0$-$20_N$ in order to write the product servo sectors to the disk 18. Prior to performing the servo writing process, the control circuitry 26 synchronizes to the spiral tracks $20_0$-$20_N$, learns the velocity feedforward compensation values while in a velocity error servo mode, initializes position feedforward compensation values using the velocity feedforward compensation values, switches to a position error servo mode, further adapts the position feedforward compensation values, and then begins the servo writing process. In an alternative embodiment, an external product servo writer is used to process the spiral tracks $20_0$-$20_N$ in order to write the product servo sectors to the disk 18.

FIG. 4B illustrates an "eye" pattern in the read signal that is generated when the head 16 passes over a spiral track 20. The read signal representing the spiral track comprises high frequency transitions 22 interrupted by sync marks 24. When the head 16 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for serving the head 28 when in the position error servo mode.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 may allow the spiral tracks $20_0$-$20_N$ to be written to the disk 18 using a steeper slope (by moving the head faster from the outer diameter to the inner diameter of the disk 18), which may reduce the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
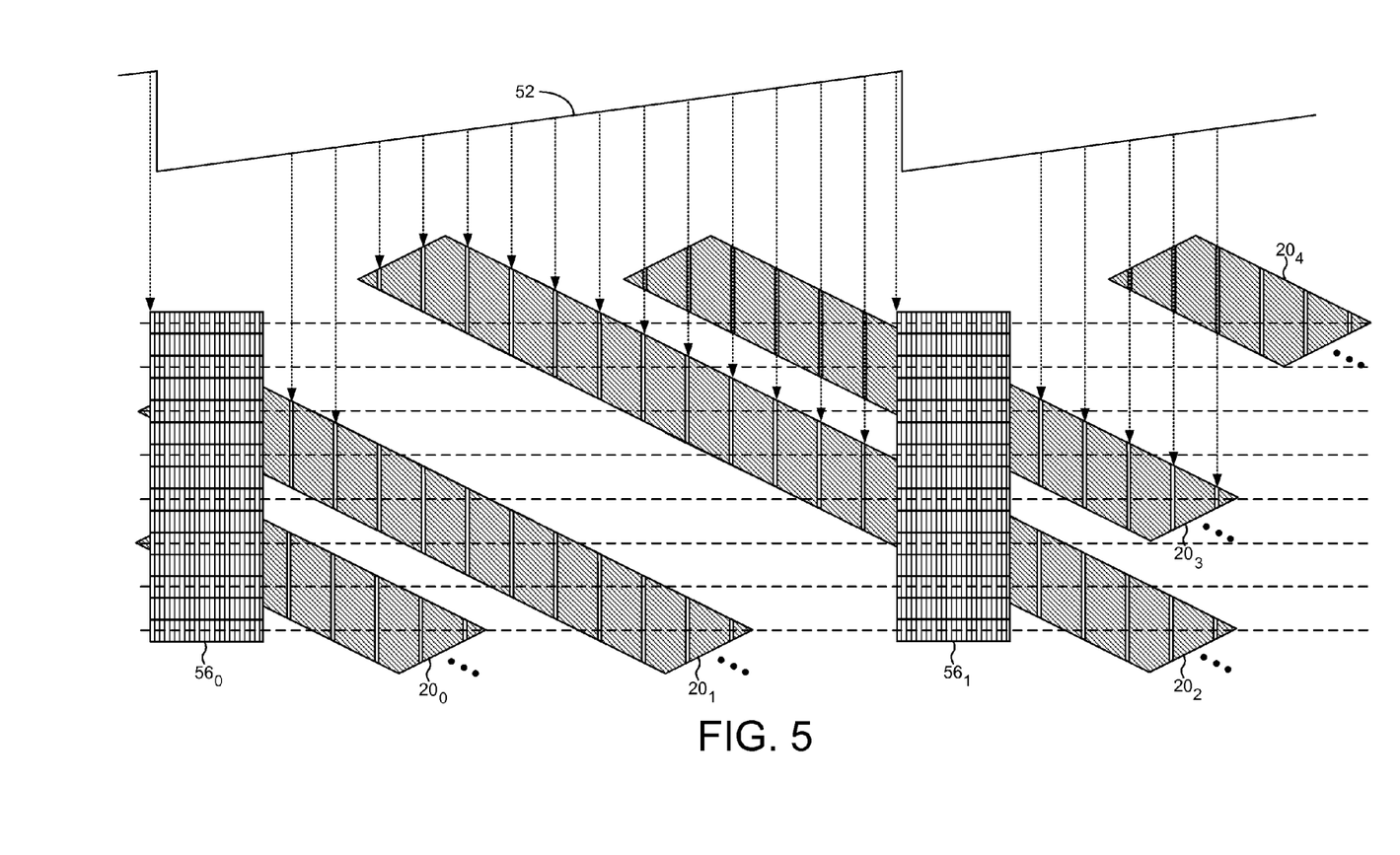
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, the data tracks are narrower than the spiral tracks 20, however, in an alternative embodiment the data tracks are wider than or proximate the width of the spiral tracks 20.

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. In one embodiment, the spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement. In the embodiment of FIG. 5, the spiral tracks 20 are written as pairs to facilitate the interleave processing; however, the spiral tracks may be written using any suitable spacing (e.g., equal spacing) while still implementing the interleaving aspect.

In another embodiment, the spiral tracks $20_0$-$20_N$ are written at less than a 2 to 1 ratio relative to the product servo sectors $56_0$-$56_N$ and all of the spiral tracks are demodulated $20_0$-$20_N$ (no interleaving). In one embodiment, when a product servo sector overwrites a spiral track, the resulting distortion in the spiral track crossing signal is detected so that the resulting PES can be ignored.

Figure 6:
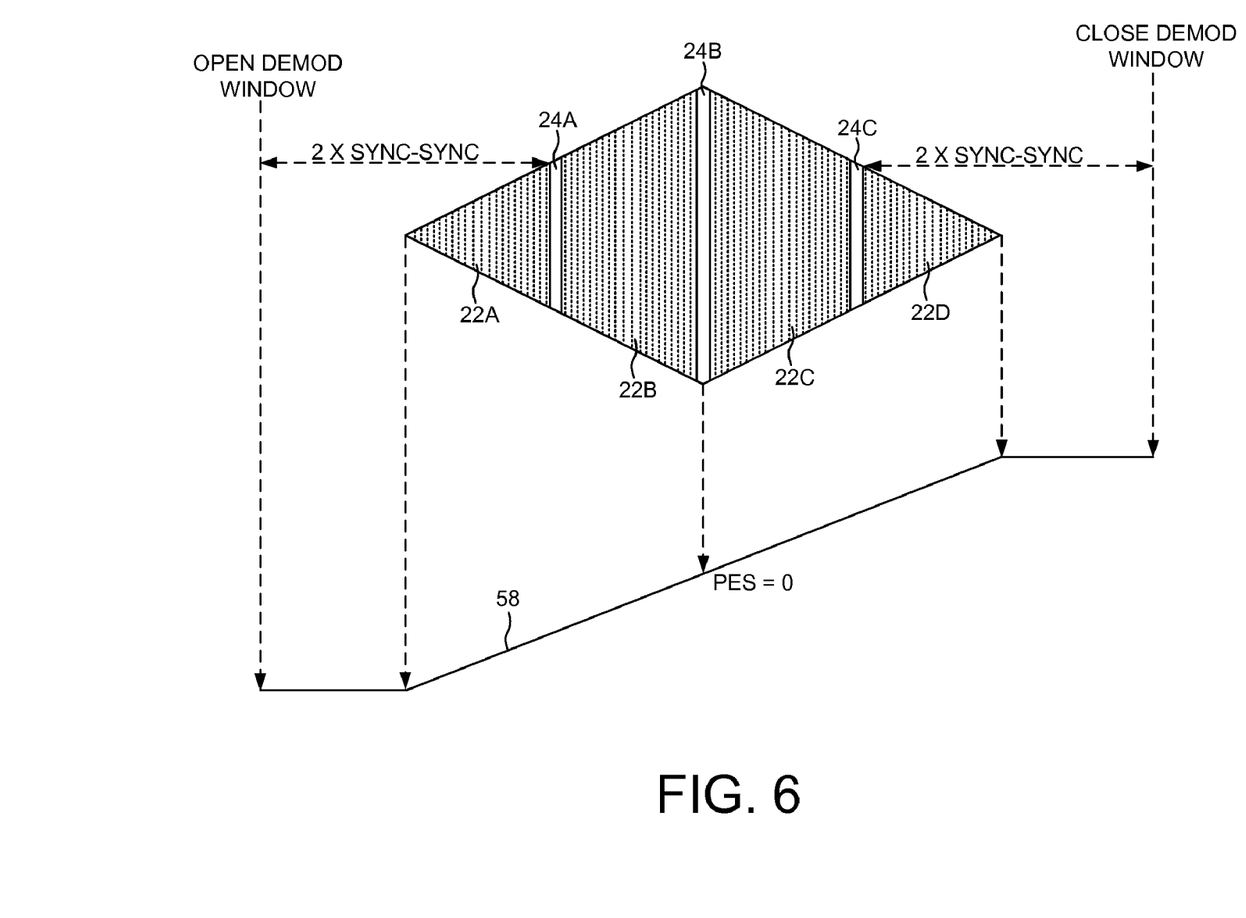
FIG. 6 illustrates an embodiment of the present invention wherein the high frequency signal in the spiral tracks is demodulated by integrating the read signal over a demodulation window and generating the PES relative to a target sync mark and a reference point on the resulting ramp signal.

FIG. 6 shows an embodiment of the present invention wherein the high frequency signal 22 in a spiral track 20 is demodulated by integrating the read signal to generate a ramp signal 58. The PES is generated relative to a target sync mark 24 in the spiral track 20 and a reference point of the ramp signal 58. In the embodiment of FIG. 6, there are three sync marks 24A-24C in each spiral track crossing (each eye pattern) and the PES is generated as the deviation of the middle sync mark 24B from the center of the ramp signal 58. This deviation can be computed as the difference in the amplitude of the ramp signal 58 when the middle sync mark 24B is detected, or the difference in time between when the middle sync mark 24B is detected and the middle of the ramp signal 58. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 58 is generated by integrating the high frequency signal 22 between the sync marks 24; that is, integration windows within the demodulation window are generated corresponding to the segments of high frequency signal 22 between each sync mark 24 (as determined from servo write clock).

Prior to writing the product servo sectors $56_0$-$56_N$ described above with reference to FIG. 5, the control circuitry 26 learns the repeatable runout associated with the spiral tracks $20_0$-$20_N$. The repeatable runout is typically caused by an eccentricity of the disk due to the center of the disk being miss-aligned with the center of a spindle motor that rotates the disk. For example, in one embodiment a media writer is used to write the spiral tracks $20_0$-$20_N$ to each disk, and then one or more disks are clamped to the spindle motor of a production disk drive. Any off-center alignment of the disk with the spindle motor results in a repeatable runout of the spiral tracks $20_0$-$20_N$ relative to the head 16. In one embodiment, the control circuitry 26 learns the repeatable runout in order to generate feedforward compensation values so that the head 16 follows the repeatable runout.

Figure 7A:
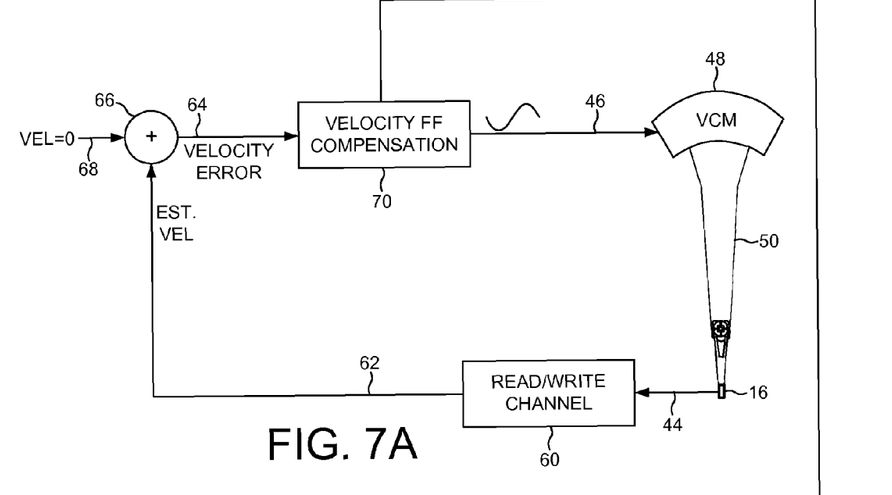
FIG. 7A shows control circuitry according to an embodiment of the present invention wherein a velocity of the head is estimated from spiral-to-spiral times and used to generate velocity feedforward compensation values to servo the head until the velocity of the head (relative to the spiral tracks) is substantially zero.

FIG. 7A shows an embodiment of the present invention wherein the control circuitry 26 initially operates in a velocity error servo mode when initially synchronizing to the spiral tracks $20_0$-$20_N$. A read/write channel 60 estimates the velocity 62 of the head 16 by evaluating the spiral-to-spiral times between consecutive spiral track crossings. When the spiral-to-spiral times are decreasing, it means the head 16 is moving toward the inner diameter of the disk, and when the spiral-to-spiral times are increasing it means the head 16 is moving toward the outer diameter of the disk. When the spiral-to-spiral times are substantially constant, it means the velocity of the head is substantially zero (relative to the spiral tracks).

Even when the velocity of the head 16 is zero relative to the base of the disk drive, the velocity of head 16 may be non-zero relative to the spiral tracks due to the repeatable runout described above. In the embodiment of FIG. 7A, a velocity error 64 is generated by subtracting 66 the estimated velocity 62 from a reference signal 68 (zero velocity). The velocity error 64 is processed to generate velocity feedforward compensation values 70. The VCM control signal 46 is generated in response to the velocity feedforward compensation values 70 which are adapted until the estimated velocity 62 is substantially zero (i.e., the spiral-to-spiral times are substantially constant).

Figure 7B:
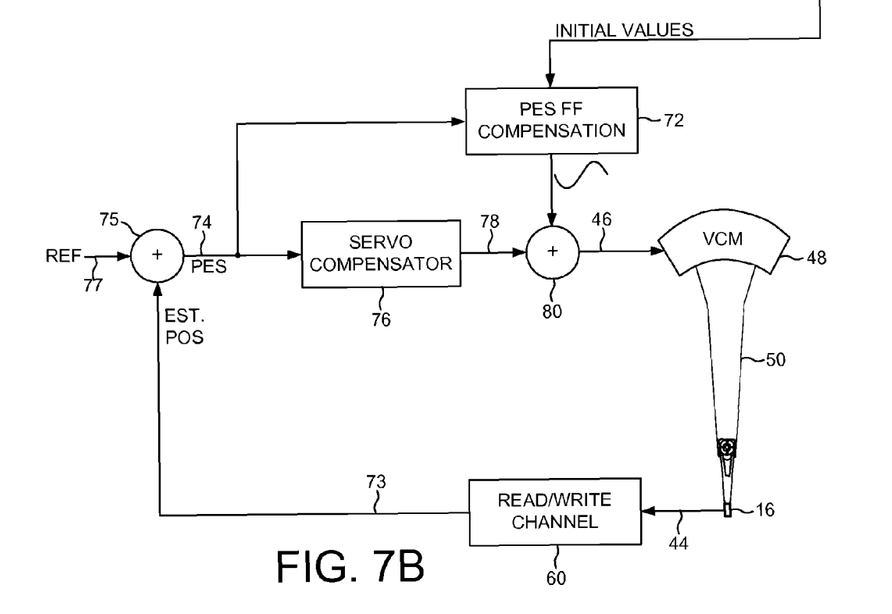
FIG. 7B shows control circuitry according to an embodiment of the present invention wherein position feedforward compensation values are initialized using the velocity feedforward compensation values.

Once the velocity feedforward compensation values 70 converge such that the estimated velocity 62 is substantially zero, the velocity feedforward compensation values 70 are used to initialize position feedforward compensation values 72 shown in FIG. 7B. The control circuitry then transitions into a position error servo mode wherein the read/write channel 60 estimates the position 73 of the head by processing the spiral track crossing, for example, as described above with reference to FIG. 6. A position error signal (PES) 74 is generated by subtracting 75 the estimated head position 73 from a reference position 77. In one embodiment, the PES 74 is processed in order to further adapt the position feedforward compensation values 72. A suitable servo compensator 76 also process the PES 74 to generate a real time control signal 78 that is combined 80 with the position feedforward compensation values 72 to generate the VCM control signal 46. The head 16 is served in the position error servo mode in order to write the product servo sectors to the disk $56_0$-$56_N$.

Figure 8A:
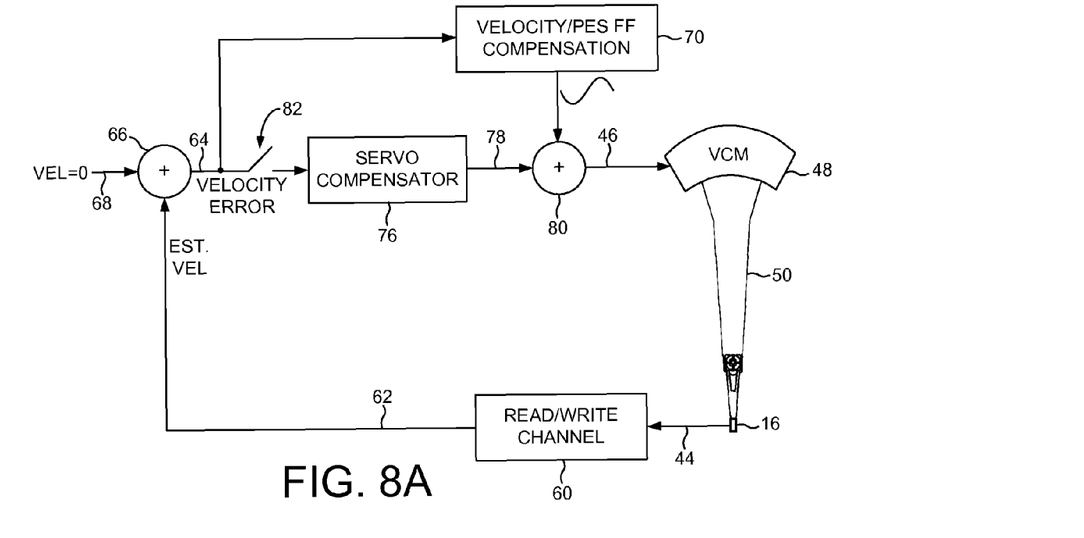
FIGS. 8A and 8B show control circuitry according to an embodiment of the present invention wherein a servo compensator is de-activated during the velocity error servo mode and activated during the position error servo mode.
Figure 8B:
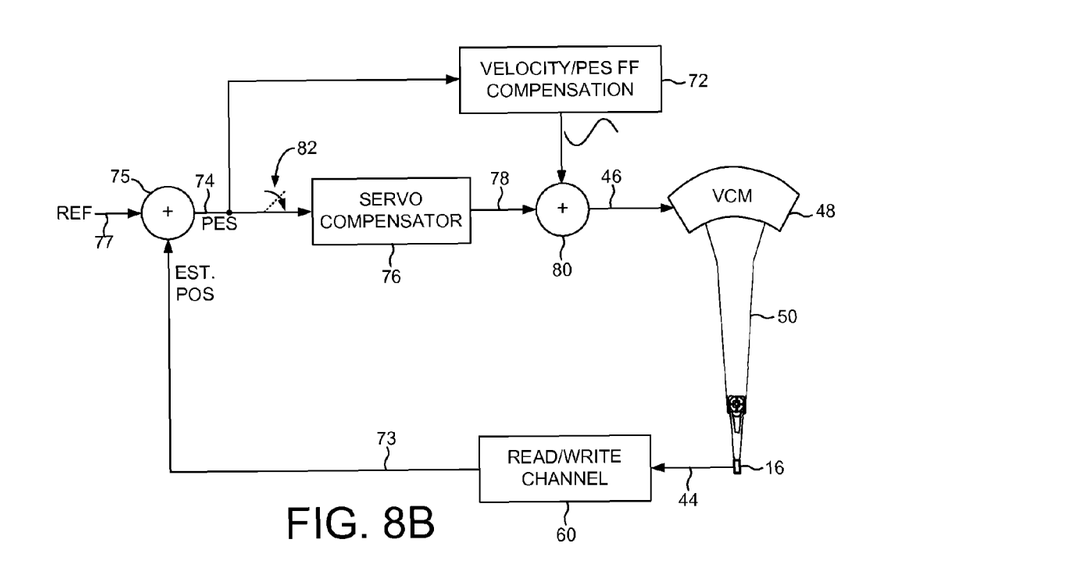

In the embodiment shown in FIGS. 7A and 7B, the final velocity feedforward compensation values 70 are copied (moved in memory) in order to initialize the position feedforward compensation values 72. In an alternative embodiment shown in FIGS. 8A and 8B, the velocity feedforward compensation values simply become the position feedforward compensation values after transitioning into the position error servo mode. When in the velocity error servo mode shown in FIG. 8A, the servo compensator 76 is disabled by switch 82 while learning the velocity feedforward compensation values 70. After the velocity feedforward compensation values 70 converge, the switch 82 is closed to enable the servo compensator 76 and the velocity feedforward compensation values 70 become the initial position feedforward compensation values 72 as shown in FIG. 8B.

Any suitable technique may be employed to generate the velocity feedforward compensation values in response to the velocity error 64, as well as adapt the initial position feedforward compensation values in response to the PES 74. In one embodiment, the feedforward compensation values are generated by computing coefficients {a,b} of a sinusoid representing the repeatable runout disturbance:

$$a^*\cos(2\pi k/N)+b^*\sin(2\pi k/N)$$

where k is an index representing one of the N spiral tracks $20_0$-$20_N$. The coefficients {a,b} may be computed in any suitable manner, such with an iterative learning algorithm:

$$a(k+1)=a(k)-G^*e(k)^*\cos(2\pi k/N)$$

$$b(k+1)=b(k)-G^*e(k)^*\sin(2\pi k/N)$$

wherein G is a predetermined gain and e(k) is the error (velocity or position) measured at each spiral track crossing. The above equation may be computed for a number of iterations (a number of disk revolutions) until the error signal falls below a predetermined threshold. Another technique for computing the coefficients {a,b} is described in U.S. Pat. No. 7,265,933 entitled "DISK DRIVE COMPUTING REPEATABLE RUN OUT WHILE ACTUATOR ARM IS PRESSED AGAINST A CRASH STOP" the disclosure of which is incorporated herein by reference.

The above equations generate feedforward compensation values that compensate for the once-around RRO (fundamental or 1F frequency). Alternative embodiments of the present invention may compensate for other frequencies (e.g., other harmonics) in addition to or instead of the once-around frequency. In yet other embodiments, the sampling rate of the learning algorithm may be reduced by processing less than every spiral track crossing (e.g., by processing every other spiral track crossing) and then interpolating to estimate the feedforward compensation values for the "missed" spiral tracks.

Figure 9A:
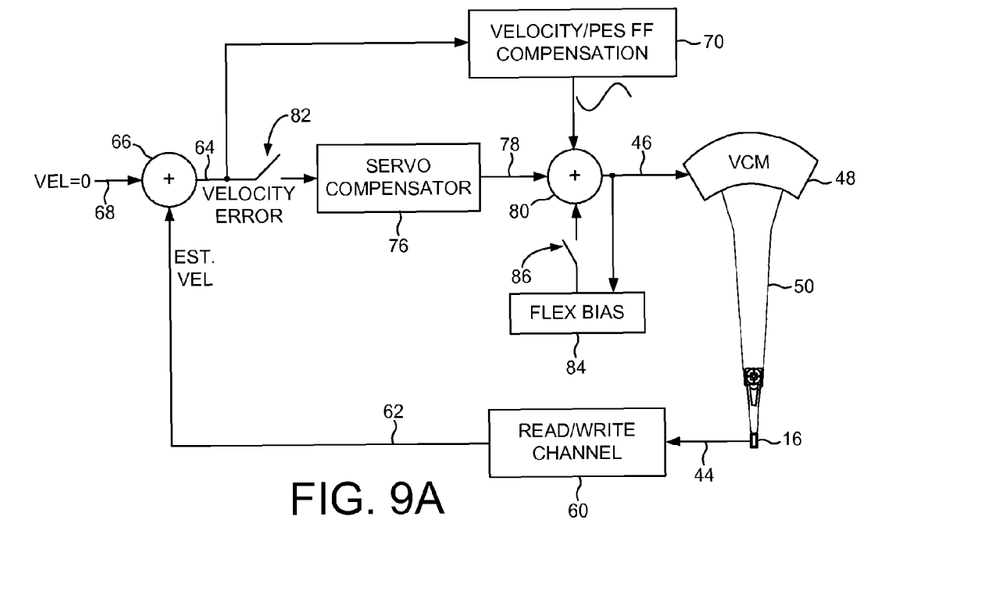
FIGS. 9A and 9B show control circuitry according to an embodiment of the present invention wherein a flex bias compensation value computed during the velocity error servo mode is used as an initial flex bias compensation value after transitioning into the position error servo mode.
Figure 9B:
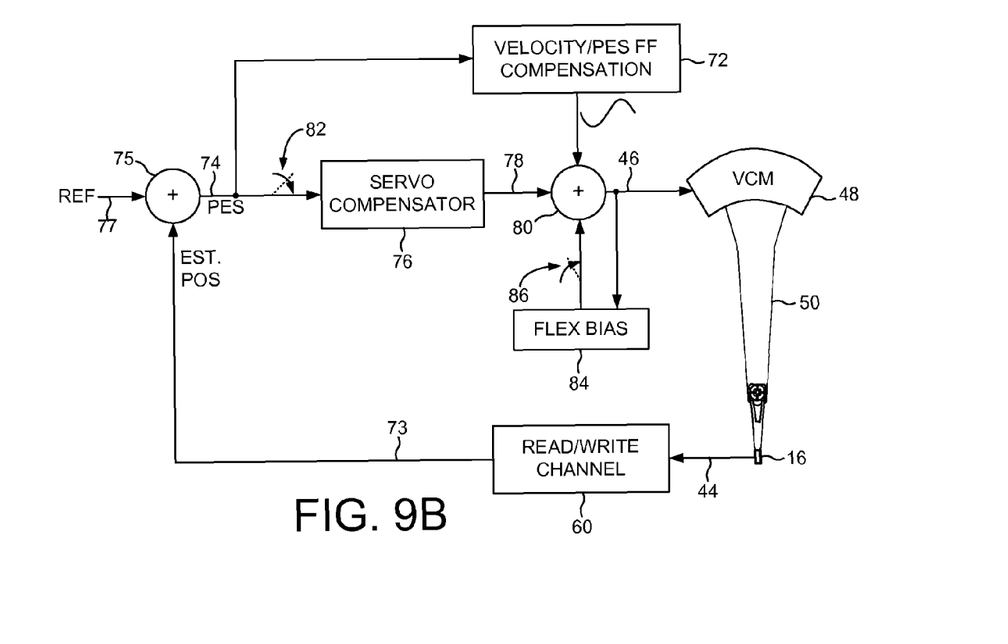

In one embodiment, the disk drive comprises a flex circuit for coupling the read/write signals of the head 16 (via a preamp circuit) to a printed circuit board mounted to the base of the disk drive. The flex circuit may apply a biasing force to the actuator arm 50 which may be estimated and compensated by the servo system. FIGS. 9A and 9B illustrate an embodiment of the present invention wherein when in the velocity error servo mode (FIG. 9A) a flex bias compensation value 84 is computed in response to the VCM control signal 46. For example, in one embodiment the flex bias compensation value 84 is computed as the average of the VCM control signal 46 while in the velocity error servo mode. After transitioning into the position error servo mode (FIG. 9B), the flex bias compensation value 84 together with the PES 74 and the position error feedforward compensation values 72 are used to servo the head 16. In one embodiment, the flex bias compensation value 84 computed during the velocity error servo mode may be further adapted in response to the VCM control signal 46 while in the position error servo mode. In another embodiment, a switch 86 disables the flex bias compensation value 84 while in the velocity error servo mode.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of spiral tracks, wherein each spiral track comprises a high frequency signal interrupted by a sync mark at a sync mark interval;
    a head actuated over the disk; and
    control circuitry operable to:
        position the head over the disk;
        use the head to read the spiral tracks to detect a plurality of spiral-to-spiral times each representing a time between consecutive spiral crossings;
        estimate a velocity of the head in response to the spiral-to-spiral times;
        generate velocity feedforward compensation values from the estimated head velocity;
        generate a control signal to position the head over the disk in response to the velocity feedforward compensation values;
        when the detected spiral-to-spiral times are substantially constant, initialize position feedforward compensation values in response to the velocity feedforward compensation values;
        estimate a position of the head in response to the spiral tracks; and
        servo the head in response to the estimated head position and the position feedforward compensation values.

2. The disk drive as recited in claim 1, wherein the velocity feedforward compensation values cause the head to substantially follow a repeatable runout of the disk.

3. The disk drive as recited in claim 2, wherein the velocity feedforward compensation values cause the head to substantially follow a once-around repeatable runout of the disk.

4. The disk drive as recited in claim 1, wherein the control circuitry is further operable to:
    generate a position error signal in response to a difference between the estimated head position and a reference position; and
    servo the head in response to the position error signal.

5. The disk drive as recited in claim 4, wherein the control circuitry is further operable to adapt the position feedforward compensation values in response to the position error signal.

6. The disk drive as recited in claim 1, wherein the control circuitry is further operable to:
    generate a flex bias compensation value in response to the control signal; and
    servo the head in response to the estimated head position, the position feedforward compensation values, and the flex bias compensation value.

7. A method of operating a disk drive, the disk drive comprising a head actuated over a disk comprising a plurality of spiral tracks, wherein each spiral track comprises a high frequency signal interrupted by a sync mark at a sync mark interval, the method comprising:
    positioning the head over the disk;
    using the head to read the spiral tracks to detect a plurality of spiral-to-spiral times each representing a time between consecutive spiral crossings;
    estimating a velocity of the head in response to the spiral-to-spiral times;
    generating velocity feedforward compensation values from the estimated head velocity;
    generating a control signal to position the head over the disk in response to the velocity feedforward compensation values;
    when the detected spiral-to-spiral times are substantially constant, initializing position feedforward compensation values in response to the velocity feedforward compensation values;
    estimating a position of the head in response to the spiral tracks; and
    serving the head in response to the estimated head position and the position feedforward compensation values.

8. The method as recited in claim 7, wherein the velocity feedforward compensation values cause the head to substantially follow a repeatable runout of the disk.

9. The method as recited in claim 8, wherein the velocity feedforward compensation values cause the head to substantially follow a once-around repeatable runout of the disk.

10. The method as recited in claim 7, further comprising:
    generating a position error signal in response to a difference between the estimated head position and a reference position; and
    serving the head in response to the position error signal.

11. The method as recited in claim 10, further comprising adapting the position feedforward compensation values in response to the position error signal.

12. The method as recited in claim 7, further comprising:
    generating a flex bias compensation value in response to the control signal; and
    serving the head in response to the estimated head position, the position feedforward compensation values, and the flex bias compensation value.

* * * * *